INVENTOR.
WALTER A. HELBIG
BY Charles H. Brown
ATTORNEY

United States Patent Office 2,891,173
Patented June 16, 1959

2,891,173

SAWTOOTH WAVE GENERATOR

Walter A. Helbig, Ashland, N.J., assignor to Radio Corporation of America, a corporation of Delaware Application January 28, 1957, Serial No. 636,767

9 Claims. (Cl. 307—88.5)

Figure 2:
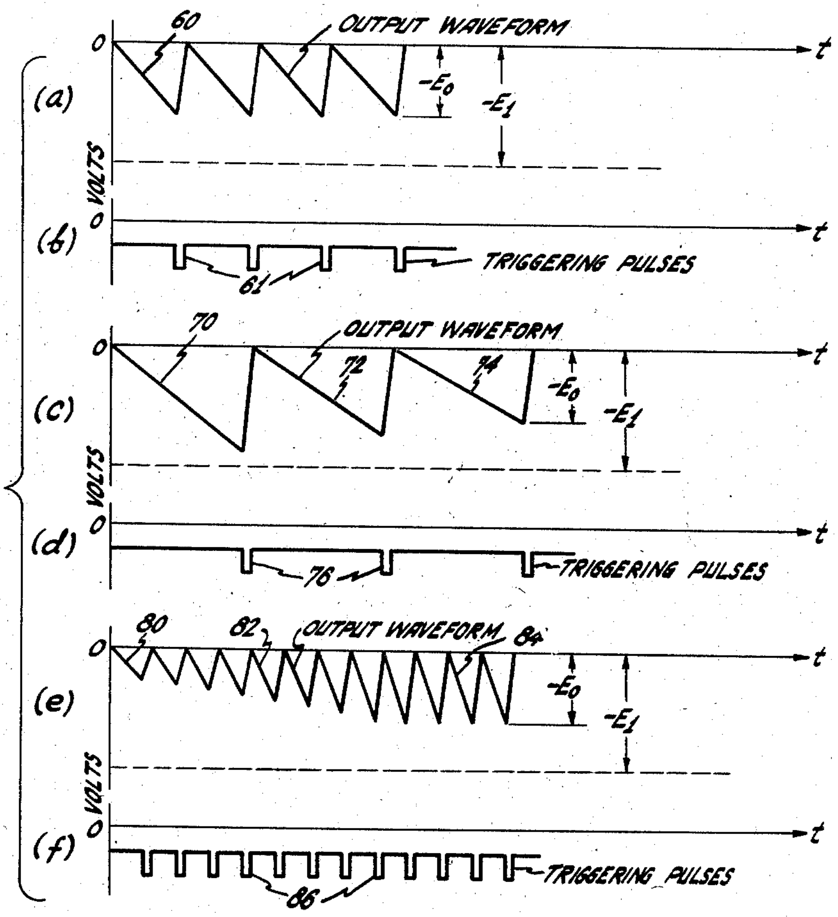

This invention relates to amplitude regulated sawtooth wave generators.

Circuits for generating sawtooth waves usually involve charging and/or discharging a capacitor at approximately a constant rate. In one such circuit, the capacitor is charged at a constant rate over a finite time period and discharged subsequently during a time period short in comparison to the charge time. The output voltage is taken across the capacitor and has the waveform of a sawtooth. If the current charging the capacitor is held constant, the voltage to which the capacitor is charged, hence the sawtooth output voltage, will be directly proportional to the charging time. Stated another way, the peak-to-peak voltage across the capacitor, hence the amplitude of the sawtooth output voltage, is directly dependent upon and proportional to the time during which the charging current flows. A switching mechanism is employed in cooperation with the capacitor to determine the charge and discharge times. The time during which the voltage across the capacitor increases as the capacitor charges corresponds to the rise time of the sawtooth output wave, while the time of the discharge resulting in decrease of voltage across the capacitor corresponds to the "flyback" or restoration time of the sawtooth. The switching mechanism may be actuated by triggering pulses. For example, the capacitor may be charged from a constant current source during the period between triggering pulses, and discharged thru an auxiliary circuit made conductive only during the application of the triggering pulses. In this manner, the frequency of the sawtooth wave generated is dependent upon the frequency or repetition rate of the triggering pulses. A decrease in the frequency of triggering pulses will allow the capacitor to charge to a higher value, resulting in a higher amplitude sawtooth output wave. An increase in the frequency of triggering pulses allows a shorter time for the capacitor to charge, and results in lower amplitude sawtooth output waves. Difficulty occurs where it is desired to obtain sawtooth waves of a constant amplitude over a range of triggering pulse frequencies.

An object of the invention is to prvoide a novel method of and means for generating a recurring sawtooth waveform, the amplitude of which is substantially independent of frequency over a relatively wide range of frequencies.

Another object is to maintain substantially constant the amplitude of sawtooth waves generated by transistor circuitry.

In one aspect, the invention comprises a sawtooth generator utilizing the unique opposite-conductivity characteristics of a plurality of semi-conductor electron flow control devices of the type known as transistors. Transistors are generally three-electrode semi-conductor devices which include a block of semi-conductive material such as germanium or silicon. This semi-conductive material may be of the n-type having an excess of electrons, or may be of the p-type having an excess of holes. The three main electrodes for a transistor are the emitter, collector and base electrodes. The transistors employed in the present invention are of the junction type. Junction transistors have a single crystal with one type of semiconductive material in the center and another type on both sides or ends. The junction transistor may be of the p-n-p or the n-p-n type. The base electrode is connected to the central material and the emitter and collector electrodes are connected to the end materials, respectively.

A p-n-p junction transistor requires means to bias the emitter positively relative to the base and means to bias the collector negatively relative to the base. An n-p-n junction transistor requires means to bias the emitter negatively relative to the base and means to bias the collector positively relative to the base.

In the circuit of the invention, a capacitor is charged by the collector current of a transistor of one conductivity type operated as a constant current device, and discharged thru a second transistor of an opposite conductivity type. The second transistor is made conductive only in response to and during the application of triggering pulses of the proper polarity from an external source. Since the capacitor charges at a linear rate during the period between triggering pulses, and discharges during the duration of the pulse, both the amplitude and the frequency of the sawtooth are normally dependent upon the frequency or repetition rate of the triggering pulses. It is a feature of this invention that any increase in sawtooth output voltage due to a decrease in the triggering frequency, or any decrease in sawtooth output voltage due to an increase in the triggering frequency, is applied to a third transistor employed as an amplitude detector. The third transistor is of the same conductivity type as the second or capacitor-discharge transistor, and of an opposite conductivity type to the first transistor employed as the constant current charging device. The first transistor may be of the type wherein current conduction increases as the voltage applied to the base electrode is made more negative. In that event, the second and third transistors would necessarily be of the type wherein the current conduction therethru would decrease as the voltage on the base electrode is made more negative. Conversely, the first transistor may be of the type wherein the current conduction will increase as the base electrode voltage is made more positive. If so, the second and third transistors would necessarily be of the type where current conduction would lessen as the base electrode voltage is made more positive.

The third or amplitude detector transistor functions as an amplitude regulator for the sawtooth generator and is connected in feedback arrangement with the first or charging transistor which operates as a constant current device. The sawtooth output wave across the capacitor is applied to the base of the third transistor as well as the output terminal. In a circuit arranged to produce a negative-going sawtooth, if the interval between triggering pulses is increased, the amplitude of the sawtooth wave, hence the voltage on the base electrode of the third transistor, becomes more negative as a result of which increased current flows in the third transistor. This increased current flow is coupled to the base electrode of the first or charging transistor in the form of an increased negative bias. Because of the opposite conductivity characteristic of this latter transistor, the collector current, hence the capacitor charging current, is reduced and over the period of several cycles the sawtooth output wave is restored to the original amplitude value. Similarly, if the interval between triggering pulses is decreased and the amplitude of the sawtooth wave becomes less negative, the resulting rise in voltage on the base electrode of the third transistor will cause a decrease in current conduction therein. This is coupled to the base of the first or charging transistor in the form of a voltage rise, causing an increase in collector current of the latter transistor. The increased charging current over the shortened period of time is such that the sawtooth output voltage is restored to its original amplitude over the period of several cycles.

Figure 1:
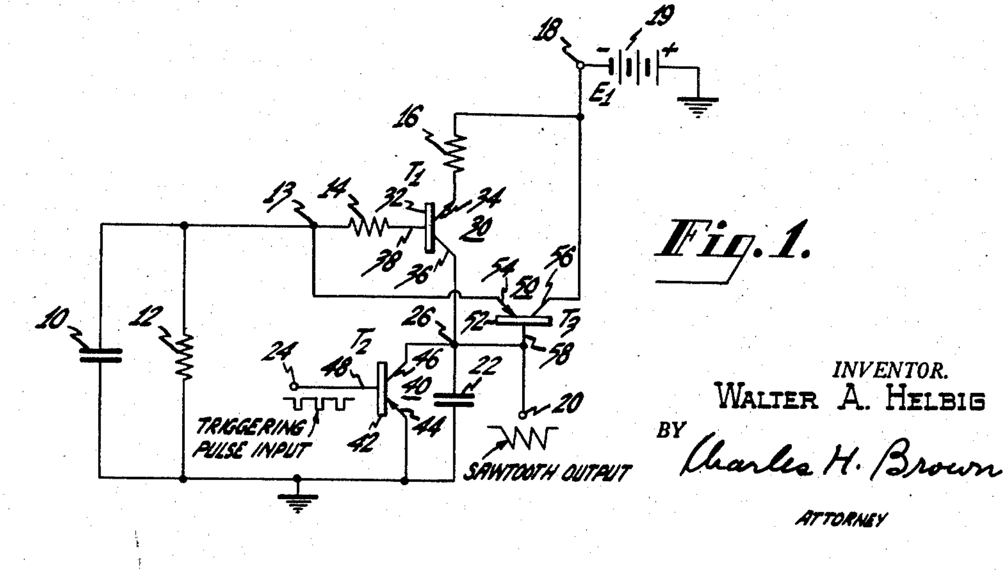

These and other objects, aspects, features and advantages of the invention will appear from a reading of the following detailed description taken in conjunction with drawing, wherein:

Figure 1 is a schematic circuit diagram of a system constructed according to the teachings of this invention for generating a sawtooth wave the amplitude of which is maintained substantially constant over a relatively wide range of frequencies.

Figure 2 graphically illustrates a series of waveforms showing how the amplitude of the sawtooth wave tends to vary in accordance with frequency changes of the triggering pulses, and how the sawtooth amplitude is thereby regulated in accordance with the invention.

Referring to Figure 1, there is shown an amplitude regulated sawtooth generator system which includes three transistors T1, T2, T3, a charging condenser 22 and a time constant or smoothing circuit 10, 12. The first transistor 30 is of the n-p-n junction type and has an emitter electrode 34 connected to a source of unidirectional potential 19 at terminal 18 thru a current limiting resistor 16, and a collector electrode 36 connected to one terminal of a charging capacitor 22, the other terminal of which is connected to a point of reference potential, such as ground. Transistor 30, which shall henceforth be referred to as $T_1$, also has a semi-conductive body 32 and a base electrode 38 and is operated as a constant current device for charging the capacitor 22.

Connected to the collector electrode 36 of transistor $T_1$ is the collector electrode 46 of a second transistor 40, henceforth referred to as $T_2$, which is of the p-n-p type. Transistor $T_2$ comprises also a semi-conductive body 42, a base electrode 48, and an emitter electrode 44. The emitter electrode 44 is connected to a point of reference potential. The collector electrode 46 and the emitter electrode 44 of transistor $T_2$ are connected across the charging capacitor 22. The base electrode 48 is connected to a triggering pulse input terminal 24, which in turn may connect to a single-swing blocking oscillator or any source of continuous pulses of the correct polarity and amplitude to make transistor $T_2$ conductive during the application of triggering pulses to terminal 24. Blocking oscillators are transformer-coupled feedback oscillators in which output current is permitted to flow for one-half cycle after which cutoff bias is imposed upon the input electrode to prevent further oscillation. A complete discussion of blocking oscillators is found on pages 205–238, "Waveforms," Chance et al., vol. 19, Radiation Laboratory Series, McGraw-Hill Book Co., Inc., 1949 edition. The output terminal 20 for the sawtooth generator is connected to the junction point 26 at which the charging capacitor 22, the collector electrode 36 of transistor $T_1$ and the collector electrode 46 of transistor $T_2$ are joined.

In addition to the charging and discharging structure thus described, the system of the instant invention includes an amplitude regulator in the form of an amplitude-detection feedback arrangement, the main element of which is a third transistor 50, which will henceforth be referred to as $T_3$. This transistor $T_3$ which is of the same p-n-p type as transistor $T_2$, comprises a semi-conductive body 52, an emitter electrode 54, a collector electrode 56, and a base electrode 58. The base electrode 58 connects to the circuit junction point 26 while the collector electrode 56 is biased by the external source of unidirectional potential 19 thru the source terminal 18. The emitter electrode 54 is connected to one end of a biasing resistor 14 and to a time-constant or smoothing network composed of a resistance 12 and a capacitor 10. The other end of biasing resistor 14 couples to the base electrode 38 of the first transistor $T_1$. The resistor 12 and capacitance 10 are connected in parallel between the junction point 13 and a point of reference potential, or ground.

Assuming the capacitor 22 is initially in a discharged state, it will be charged from unidirectional current source 19 thru transistor $T_1$ operated as a constant current device. Such operation is achieved by operation of $T_1$ in the non-saturation region; that is, the region where the collector current will remain constant irrespective of changes in collector voltage. If $T_1$ operates as a constant current device, the amplitude of the final voltage on the capacitor 22 is dependent solely upon the charging time. The function of the resistance 16 in the emitter electrode 34 lead is to assist in insuring relatively constant collector current despite variations in the individual characteristics of the transistor chosen. Such a resistance prevents transistor operation in the saturation region where collector current flow would be responsive to changes in collector voltage.

The charging current for capacitor 22 flows until such time as a negative pulse is applied to the triggering pulse input terminal 24. The waveforms of these trigger pulses may be as shown beneath terminal 24. The negative trigger pulse is coupled to the base of transistor $T_2$ which is of the transistor p-n-p type. As the base electrode 48 is thereby made more negative, the $T_2$ becomes conductive, thereby providing a low resistance discharge path for the capacitor 22 for the duration of the negative pulse. The duration of the negative pulse is carefully chosen to be just long enough to allow the capacitor 22 to fully discharge. If the timing pulse were made longer than this time, the peak value of the sawtooth wave would be flattened, this latter portion representing a non-usable time in the sawtooth waveform. The sawtooth output voltage terminal 20 is connected to one side of the capacitor 22 and the output voltage is representative of changes in the charge stored in the capacitor 22. Thus the linear portion or rise time of the sawtooth is equal to the charging period, and the flyback or restoration time of the wave is equal to the discharge period.

The operation of the sawtooth wave generator of Figure 1 is more easily understood from an inspection of the curves of Figure 2. Curve (*a*) shows the sawtooth output waveform 60 available at terminal 20, the rise time of which becomes more negative at a constant rate, until the application of the negative triggering pulses 61 to terminal 24, as indicated in curve (*b*). The capacitor 22 discharges and returns the output waveform 60 to zero during the duration of the trigger pulse 61. The peak-to-peak amplitude $E_0$ of the sawtooth output 60 is dependent upon the time interval between triggering pulses.

If the interval between triggering pulses is increased by a decrease in the repetition rate of these pulses, the capacitor 22 will tend to charge to a higher value, the limit being the value of the supply voltage applied to the supply terminal 18, which will be attained if the time between triggering pulses is long enough. If the repetition rate of the triggering pulses is increased, the charging time is lessened and the peak-to-peak value of the sawtooth output voltage appearing at output terminal 20 tends to decrease. By means of the amplitude regulation feature of the invention, however, the amplitude of the output wave is kept substantially constant over a wide range of frequencies of operation. A description of the operation of the amplitude regulation feature of the invention will now be given.

During normal operation, with the circuitry shown, the point 26 to which the output terminal 20 is connected, will become more negative as the capacitor 22 charges. This change in voltage is coupled to the base electrode 58 of the third transistor $T_3$ by direct connection. Since this is a p-n-p type junction transistor, current flow will increase as the voltage on base electrode 58 becomes more negative, and transistor $T_3$ conducts during the peak of the charge cycle, or in that region where the sawtooth output is at its most negative excursion. The flow of current in emitter 54 will, after a few cycles, charge network capacitor 10 to approximately the maximum negative voltage on the base electrode 58 of transistor $T_3$.

The function of the network resistor 12 and capacitor 10 is to provide a D.C. bias voltage (converted to a D.C. bias current by the resistor 14) for the first transistor $T_1$. By transistor action, this biasing current into the base electrode 38 of transistor $T_1$ controls the respective collector-to-emitter current. The D.C. bias voltage across the network resistor 12 and capacitor 10 is determined, as previously explained, by the third transistor $T_3$. Network resistance 12 is chosen to be fairly large in value in comparison to the sum of the base resistor 14 and the current-limiting resistor 16. The discharge time constant ($R_{12} \times C_{10}$) of the resistance 12-capacitance 10 network is made very much larger than the maximum interval between triggering pulses, and the charge across the capacitor 10 assumes a constant value from the peak of one cycle to the next, giving a constant biasing current into the base electrode 38 of transistor $T_1$.

If the repetition rate of the triggering pulses is decreased, the peak-to-peak voltage across the capacitor 22 tends to increase, approaching the value of the supply voltage. Curve (*c*) of Figure 2 shows the output voltage at terminal 20 while curve (*d*) indicates the triggering pulses of increased rate and their relation to the output voltage. It is seen that the intervals between the negative triggering pulses 76 are longer than for the triggering pulses 61 of curve (*b*) which have a higher repetition rate. Curve (*c*) also illustrates the linear portion of the sawtooth 70 during the charging time as it tends to approach the supply voltage $-E_1$ during the interval between the triggering pulses 76. This behavior occurs initially after the triggering pulse repetition rate is decreased. As the increased negative voltage across the capacitor 22 is applied to the base electrode 58 of the third transistor $T_3$, this transistor will conduct more heavily at the peaks of the sawtooth wave. The increased emitter-to-collector current of transistor $T_3$ makes the voltage on the network capacitor 10 more negative, thus decreasing the base current into transistor $T_1$. By transistor action, the collector-to-emitter current of the first transistor $T_1$ is thus decreased. The process of charging the capacitor 10 continues over a few cycles until a stable point is reached and the peak-to-peak amplitude of the sawtooth is the desired (original) value, $E_0$. This amplitude-regulation action is illustrated in curve (*c*) where the first linear portion of the sawtooth 70 is seen to approach the supply voltage $E_1$ as the repetition rate of the triggering pulses 76 is lessened. The linear portion of the second sawtooth 72 is seen to have less of a slope than that of the first sawtooth 70 as the amplitude-regulation feature starts to decrease the value of the charging current. The sawtooth peak-to-peak voltage tends to more nearly approach the desired value of $E_0$. The third sawtooth wave of curve (*c*) is shown to have a linear portion 74 of a different slope than the second 72, representing an even smaller charging current. The stable condition where the sawtooth output voltage reaches the desired output level of $E_0$ is realized after several cycles.

In the event that the pulse repetition rate is increased, the time period between pulses is lessened, and the capacitor 22 will have less of a charge placed upon it. The resulting peak-to-peak output voltage of the circuit will be less than the desired value $E_0$. Amplitude stabilization is accomplished in a manner similar to that described for a slower pulse repetition rate. The less negative excursions of the output sawtooth on the base electrode 58 cause the third transistor $T_3$ to cease conduction. The capacitor 10 partially discharges thru the associated network resistance 12, decreasing the negative voltage on the network. The current flowing into the base electrode 38 of the first transistor $T_1$ is thereby increased. By transistor action this results in an increase of collector-to-base current, and increased collector-to-emitter current which increases the charging rate of the capacitor 22 until the desired peak-to-peak sawtooth output value $E_0$ is reached.

The amplitude-regulation action in the case of an increased triggering pulse repetition rate is illustrated by curves (*e*) and (*f*) of Figure 2. Curve (*f*) indicates that the triggering pulses 86 occur at a considerably higher frequency than those of curve (*b*), the first case illustrated. In curve (*e*), the linear portion 80 of the first sawtooth is seen to fall considerably short of the desired output voltage $E_0$ as the charging time is short. The subsequent sawtooth linear portion 82 is seen to more closely approach the desired output value, the increased charging current being illustrated by the decreased slope of the wave 82 in comparison to the first wave 80. A further sawtooth wave 84 of curve (*e*) is seen to have reached the desired peak-to-peak value of $E_0$, the slope of the linear portion illustrating the correct value of current necessary to charge the capacitor 22 to the correct peak-to-peak value during the shortened charging time.

By way of example only, a system as shown in Figure 1 was constructed having a variable range of 10 to 30 microseconds between triggering pulses, or a sawtooth output wave adjustable in frequency between approximately 30 and 100 kilocycles. The amplitude regulation of the circuit over this frequency range was excellent, the peak-to-peak value of the sawtooth output wave being held substantially constant at 22.5 volts. The circuit elements of the system providing this relationship were as follows:

| | | |
|---|---|---|
| Transistor **30**, n-p-n junction | | Type 2N94A |
| Transistor **40**, p-n-p junction | | Type RR–153 |
| Transistor **50**, p-n-p junction | | Type RR–153 |
| Resistor **12** | ohms | 220,000 |
| Resistor **14** | do | 8,200 |
| Resistor **16** | do | 4,700 |
| Capacitor **10** | microfarads | 1 |
| Capacitor **22** | micromicrofarads | 330 |

The circuit of the invention produces a negative-going sawtooth wave. A positive-going sawtooth may be produced by substitution of n-p-n junction transistors for the p-n-p junction transistors shown, and vice versa, and a reversal of the polarity of the voltage supply. The frequency range of the generator may be altered if the frequency of the triggering pulses and the value of the charging capacitor 22 are changed.

What is claimed is:

1. A sawtooth generator comprising, first, second, and third transistors each having a base electrode, a collector electrode, and an emitter electrode, said first transistor having opposite conduction characteristics to said second and third transistors, a charging capacitor connected between the collector electrode of said first transistor and a point of reference potential, a current-limiting resistor, means supplying a unidirectional source current supply to the emitter electrode of said first transistor thru said current-limiting resistor, means coupled to the base electrode of said second transistor for supplying triggering pulses thereto, means connecting the emitter electrode of said second transistor to said point of reference potential, means connecting the collector electrode of said second transistor to both the collector electrode of said first transistor and the base electrode of said third transistor, a resistance-capacitance time-constant network connected between the emitter electrode of said third transistor and said point of reference potential, a resistance connected between the base electrode of the first transistor and the emitter electrode of the third transistor, means connecting the collector electrode of the third transistor to said source of unidirectional current supply, and an output terminal for said generator connected to the base electrode of said third transistor.

2. A sawtooth generator as defined in claim 1, wherein said network includes a resistor and capacitor connected in parallel and having values such that the time constant of said network is larged than the maximum interval between said triggering pulses.

3. A sawtooth generator as defined in claim 1 wherein, said transistors are junction type transistors.

4. A sawtooth generator as defined in claim 1, wherein said first transistor is a n–p–n junction transistor and said second and third transistors are p–n–p junction transistors.

5. A sawtooth generator as defined in claim 1, wherein said first transistor is a p–n–p junction transistor and said second and third transistors are n–p–n junction transistors.

6. An amplitude regulated sawtooth wave generator comprising a transistor device of one conductivity type, second and third transistor devices both of a conductivity type opposite to that of said first device, a capacitor, a source of unidirectional potential, means to connect said capacitor and said first device in series between said source and a point of reference potential to supply charging current through said first device to said capacitor, means to connect said second device across said capacitor and means to supply triggering pulses to said second device to cause said second device to become conductive and non-conductive at a rate determined according to the frequency of said pulses, means to connect said third device to a point in the connection between said capacitor and said first device to cause said third device to conduct according to the potential variations across said capacitor, a second capacitor, a resistor, means to connect said second capacitor and said resistor in parallel to form a network having a given time constant between said first device and said point of reference potential, means to connect said third device between said source and a point in the connection between said network and said first device, said network being arranged to apply a bias potential to said first device as a function of the changes in current flow through said third device according to said potential variations across said first capacitor, and an output terminal connected to said point in the connection between said first capacitor and said first device.

7. A sawtooth wave generator comprising first, second and third current conducting devices each having first, second and third electrodes, a charging capacitor connected between said third electrode of said first device and a point of reference potential, a current-limiting resistor, a source of unidirectional potential, means to connect said first electrode of said first device through said current-limiting resistor to said source, means to apply triggering pulses to said second electrode of said second device, means to connect said first electrode of said second device to said point of reference potential, means to connect said third electrode of said second device to the junction of said capacitor and said third electrode of said first device, means to connect said second electrode of said third device to said junction, a second capacitor, a second resistor, means to connect said second capacitor and said second resistor in parallel as a network having a given time constant between said first electrode of said third device and said point of reference potential, a third resistor, means to connect said second electrode of said first device through said third resistor to the junction of said network and said first electrode of said third device, means to connect said third electrode of said third device to said source, an output terminal, and means to connect said output terminal to said second electrode of said third device.

8. A sawtooth wave generator as claimed in claim 7 and wherein said first device is a n–p–n junction transistor and said second and third devices are p–n–p junction transistors, said transistors each having emitter, base and collector electrodes, said first electrodes corresponding to said emitter electrodes of said respective transistors, said second electrodes corresponding to said base electrodes of said respective transistors, and said third electrodes corresponding to said collector electrodes of said respective transistors.

9. A sawtooth wave generator as claimed in claim 7 and wherein said first device is a p–n–p junction transistor and said second and third devices are n–p–n junction transistors.

References Cited in the file of this patent

UNITED STATES PATENTS

| | | |
|---|---|---|
| 2,627,031 | Moore | Jan. 27, 1953 |
| 2,662,981 | Segerstrom | Dec. 15, 1953 |
| 2,776,382 | Jensen | Jan. 1, 1957 |